United States Patent [19]
Roy

[11] 3,774,097
[45] Nov. 20, 1973

[54] ELECTROMAGNETIC POSITIONING SYSTEM
[76] Inventor: John R. Roy, 95 Bucynes Dr., North Tonawanda, N.Y.
[22] Filed: Sept. 9, 1971
[21] Appl. No.: 178,900

[52] U.S. Cl.................. 318/563, 318/568, 318/162
[51] Int. Cl. .......................................... G05b 19/42
[58] Field of Search.................... 318/653, 568, 162, 318/467; 219/512

[56] References Cited
UNITED STATES PATENTS
1,594,158  7/1926  Else ................................ 219/512 X
3,068,386  12/1962  Jaeger et al.......................... 318/594
3,517,283  6/1970  McCullough .................... 318/653 X
3,241,021  3/1966  Schmidt et al...................... 318/568
3,641,535  2/1972  Knopf............................ 318/568 X Primary Examiner—B. Dobeck
Attorney—Conrad Christel et al.

[57] ABSTRACT

In a machine having two relatively movable members, such as the bed and carriage of a machine tool, drive means for moving one of the members, and control means coupled to the drive means, a positioning system for changing the relative movement of the machine members after a predetermined distance has been traveled. A retentive member of magnetizable material, such as a steel tape or rod, is mounted on one of the machine members, for example on the carriage, and is disposed generally parallel to the direction of relative movement. A magnetic recording means is mounted on the other machine member for magnetizing the retentive member at a discrete point thereon corresponding to the relative position of the machine members at which movement is to be changed. This recording is sensed by means which develops an electrical signal for causing the machine control to change the movement, for example to stop the carriage.

8 Claims, 3 Drawing Figures

INVENTOR.
JOHN R. ROY

ELECTROMAGNETIC POSITIONING SYSTEM

BACKGROUND OF THE INVENTION

This invention relates to generally to the control art, and more particularly to a positioning system for changing the relative movement of machine members after a predetermined distance has been traveled.

One area of use of the present invention is in controlling machines or machine tools for cutting, drilling and the like, wherein a particular operation is to be performed repetitively for a given number of times on the same or on a plurality of workpieces whereupon the machine controls are reset for a different operation. While the present invention will be described with particular reference to such machine operations, for example drilling a plurality of holes each of the same depth, it is to be understood that the principles of the invention can be variously applied.

Some controls for machines and machine tools of this general type which are presently available include mechanical trip stops and limit switches in the electrical system controlling the positions of the machine members. These controls can require many trial settings and adjustments before they will function properly. Other available control systems include electronic pulse counting and feedback systems which can create positioning errors when signals are missed or when spurious signals enter into the system. Mechanical wear and backlash can affect the operation of lead screws included in many machines which also can give rise to positioning errors. Furthermore many electronic positioning systems are rather complex and accordingly considerably expensive.

SUMMARY OF THE INVENTION

It is, therefore, an object of this invention to provide a new and improved positioning system for changing the relative movement of machine members after a predetermined distance has been traveled.

It is a further object of this invention to provide such a positioning system which is accurate, requires only a single setting or adjustment, and is relatively simple in construction and convenient and easy to maintain.

It is a further object of this invention to provide such a positioning system capable of both changing the rate of relative movement as well as stopping the movement between machine members.

The present invention provides a positioning system for changing the relative movement of machine members after a predetermined distance has been traveled wherein the relative position between the members at which the movement is to be changed is recorded on a member of magnetizable material carried by one of the machine members. The magnetic recording thereafter is sensed when the machine members arrive at the point where movement is to be changed, for example slowed or stopped, whereupon an electrical signal is produced to command the machine to cause the desired change in movement.

The foregoing and additional advantages and characterizing features of the present invention will become clearly apparent upon a reading of the ensuing detailed description together with the included drawing.

BRIEF DESCRIPTION OF THE DRAWING FIGURES

DETAILED DESCRIPTION OF THE ILLUSTRATED EMBODIMENT

Figure 1:
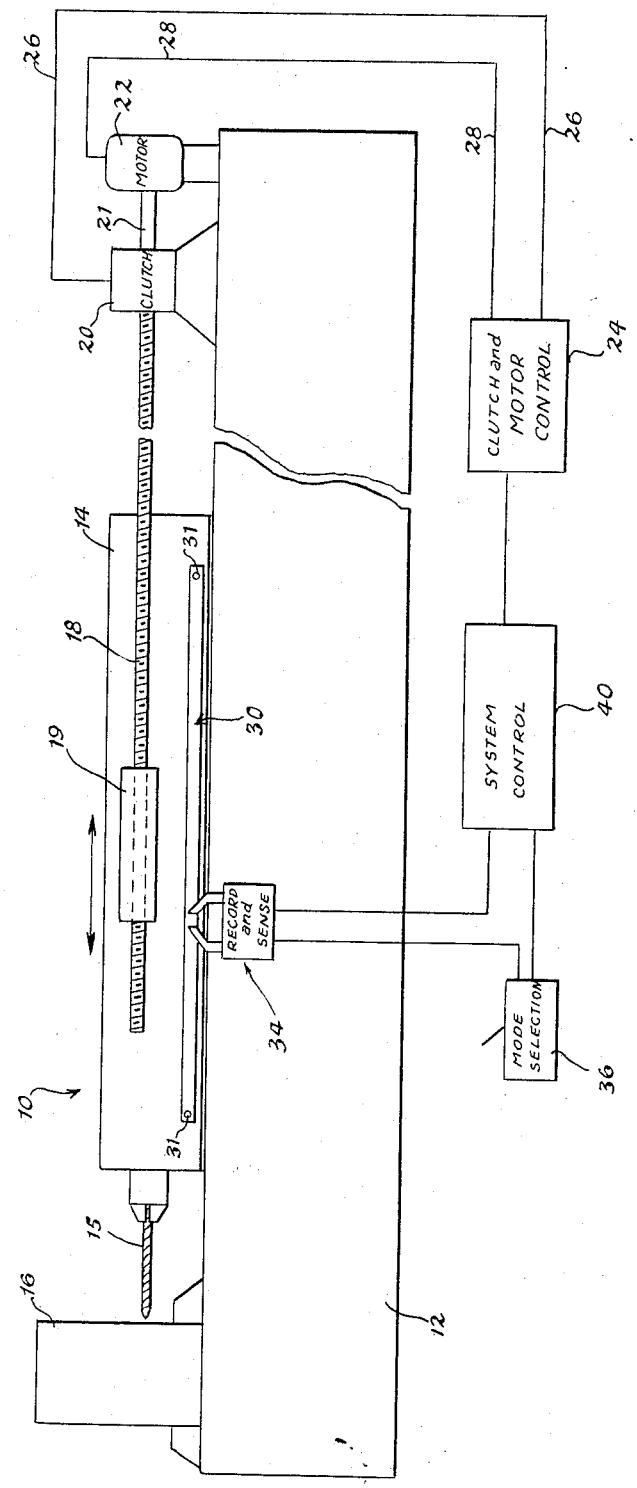
FIG. 1 is a block diagram of a positioning system according to the present invention.

Referring now to FIG. 1, 10 designates generally a machine having first and second relatively movable members. In the present illustration machine 10 is a machine tool having a bed 12 and a carriage 14 to which a tool such as a drill 15 is connected for operation on a workpiece or part 16. Bed 12 is stationary and carriage 14 is movable relative thereto by means of a lead screw 18 connected to carriage 14 through a suitable mechanical coupling 19 and coupled through a clutch 20 to the output shaft 21 of a drive motor 22. Clutch 20 and motor 22 are controlled by a sequencer 24 connected thereto by electrical lines 26, 28 respectively, and electrical power for operating motor 22 and sequencer 24 is obtained from a suitable supply or source (not shown). In addition, drill 15 is driven by suitable means (not shown) included in machine 10. The foregoing arrangement is illustrative of a typical and well-known machine tool arrangement to which the positioning system of the present invention is applicable. Because these machines are well-known and in wide-spread use, a detailed description thereof is deemed to be unnecessary. Furthermore, the foregoing arrangement is merely illustrative of various types of machines and machine tools having relatively movable members, to which the present invention may be applied.

In accordance with the present invention, a retentive member 30 of magnetizable material is mounted on one of the machine members, in the present illustration on the relatively movable member or carriage 14. The machine members 12 and 14 move in directions parallel to each other in the present illustration. Member 30 is elongated and disposed so that the longitudinal axis thereof is generally parallel to the direction of relative movement of members 12, 14. A preferred material for member 30 is steel, and it can have various forms such as a relatively thin tape or a rod. Alternatively, member 30 could be of non-magnetic material having a surface thereof plated or coated with magnetic material. In the illustration of FIG. 1, member 30 is in the form of a thin tape, mounted at each end thereof to carriage 14 by suitable fasteners 31. These various forms of member 30 together with an alternative arrangement for mounting member 30 will be described in further detail presently.

The positioning system of the present invention further comprises recording means on the other machine member, i.e. on stationary bed 12, for magnetizing the recordable member 30 at a discrete point thereon corresponding to the relative position of the first and second machine members 12 and 14, respectively, at which relative movement is to be changed. The positioning system further comprises sensing means on the same machine member, i.e. on bed 12, for sensing the magnetic recording on member 30 during relative movement of the machine members 12, 14 and for producing an output signal in response thereto. According to a preferred mode of the present invention, the recording means and sensing means are provided by a magnetic recording and pickup head shown generally at 34 in FIG. 1, the particular mode of operation of head 34 being determined by a mode selection means 36 connected to head 34. The positioning system of the present invention also comprises means 40 coupled to the sensing means, i.e. to head 34, and to the machine clutch and motor control or sequencer 24 whereby in response to a signal produced by the sensing means, sequencer 24 is caused to change the relative movement between the machine members 12 and 14. For example, the relative movement between bed 12 and carriage 14 can be speeded up, slowed down, or stopped completely by the system of the present invention.

Figure 2:
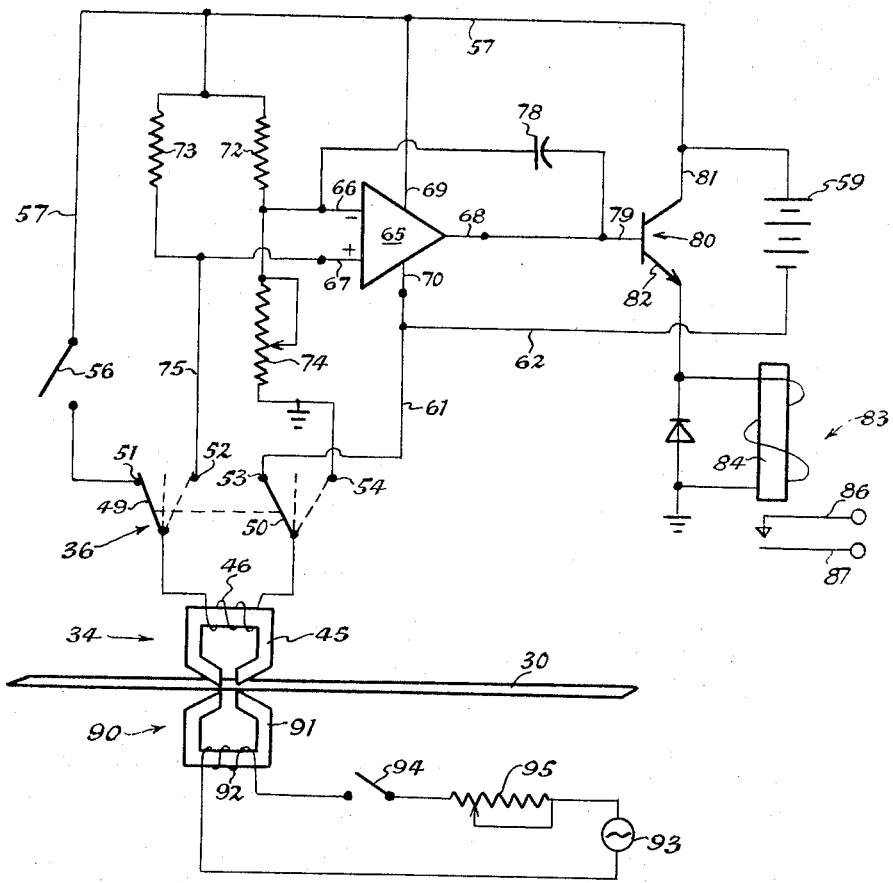
FIG. 2 is a schematic circuit diagram of a portion of the system of FIG. 1.

FIG. 2 is a schematic diagram illustrating in detail a preferred electrical circuit including head 34, selection means 36 and means 40. Head 34 comprises a core 45 having a winding 46. Means 36 for selection the mode of operation of head 34 comprises a double-pole double-throw switch having a pair of arms 49, 50 to which opposite sides of winding 46 are electrically connected. Arm 49 of switch 49 is movable between a pair of contacts 51, 52 and arm 50 is simultaneously moved between a pair of contacts 53 and 54. FIG. 2 shows switch 36 in the recording mode where arm 49 engages contact 51 to connect one side of winding 46 through a switch 56 and a line 57 to the positive terminal of a source of relatively low d.c. voltage in the form of battery 59. In this recording position of switch 36, arm 50 engages contact 53 to connect the other side of winding 46 through lines 61 and 62 to the negative terminal of battery 59.

The circuit of control means 40 comprises a differential operational amplifier indicated schematically at 65. One preferred form of amplifier 65 is commercially available from Analog Devices, Inc. designated model 40J. Amplifier 65 has negative and positive input terminals 66 and 67, respectively, an output terminal 68 and a pair of bias terminals 69 and 70. Input terminals 66 and 67 are connected through resistors 72 and 73, respectively, to line 57 on which the positive voltage is available. The junction of input terminal 66 and resistor 72 is connected through a variable resistor 74 to contact 54 of switch 36. The junction of input terminal 67 and resistor 73 is connected directly by a line 75 to switch contact 52. Bias terminals 69, 70 are connected to lines 57 and 62, respectively, on which the positive and negative levels, respectively, direct voltage are available. Amplifier output terminal 68 is coupled through a capacitor 78 to negative input terminal 66. Output terminal 68 also is connected to the control or base terminal 79 of a transistor switch 80, the collector terminal 81 of which is connected to the positive terminal of battery 59. The emitter terminal 82 of transistor 80 is connected to one terminal of the control winding of a relay 83, the other terminal of which is grounded. The relay plunger 84 operates a pair of switch contacts 86, 87 which, in turn, control the flow of electrical power to sequencer 24 to control operation of the same.

The system of the present invention also includes a magnetic erase head 90 including a core 91 having a winding 92, one side of which is connected directly to a source of alternating current 93 having a voltage of about 15 volts. The other side of winding 92 is connected through switch 94 and a variable resistor 95 to the other terminal of a.c. source 93.

The operation of the positioning system of the present invention will be illustrated by way of example where machine 10 is to drill a plurality of holes, each of the same depth, either in the same workpiece or in different workpieces. The workpiece to be drilled, for example workpiece 16 shown in FIG. 1, is positioned and mounted on machine 10, and the machine is operated to drill a hole to the desired depth. In the present illustration, carriage 14 moves to the left in FIG. 1 relative to bed 12, and the final position of carriage 14 relative to bed 12 corresponds to the desired depth of the hole in workpiece 16. At that point head 34 is operated in the recording mode to make a magnetic recording on medium 30 corresponding to that position. This is accomplished by placing switch 36 in the recording position shown in FIG. 2 and by closing switch 56 momentarily. Coil 46 is energized and the resulting magnetic flux in and around the air gap between the pole pieces of core 45 magnetizes a discrete portion of the surface of member 30 adjacent head 34. Then carriage 14 is moved to the right in FIG. 1 and returned to its initial position, workpiece 16 is either moved or replaced by a new workpiece, and then carriage 14 again is moved to the left in FIG. 1 to begin drilling of the next hole. Switch 48 is moved to the sense position at or prior to the beginning of this next machine operation. When head 34 reaches the location or point on member 30 which is magnetized, the magnetic flux from the recording on member 30 changes the magnetic state of the air gap of core 45 resulting in a change in the flow of current in winding 46. This, in turn, is applied to the inputs of amplifier 65, and the amplified output turns on transistor 80 to cause a flow of current through the winding of relay 83. Plunger 84 is operated to close switch contacts 86, 87, and as a result, sequencer 24 is operated to stop the movement of carriage 14 by disengaging clutch 20. Machine 10 or sequencer 24 would be provided with a suitable control to return carriage 14 after stopping thereof. Switch 48 is maintained in the position corresponding to the sensing mode during the desired number of drillings of the same depth. When they are finished and it is desired to make a new setting, the recording on member 30 is erased by energizing head 90 after carriage 14 has been moved to position the recording on member 30 adjacent or proximate head 90. Resistor 95 is adjusted to vary the level of current to that which is required to erase the recording on member 30.

It is within the scope of this invention to place two spaced-apart magnetic recording on member 30, a first corresponding to the point at which the rate of travel between carriage 14 and bed 12 is to be changed, i.e. slowed down, and a second at which the relative movement is to be stopped. As a result, carriage 14 can be advanced rapidly to the location of the first recording, slowed down, and then advanced further to the stopping point. This would minimize inertia effects, and is particularly advantageous in drilling where position-to-position speed is important. In this connection, sequencer 24 would have the capability of causing a reduction in the speed of motor 22 in response to a first signal from means 40 and of causing disengagement of clutch 20 in response to a second signal from means 40.

A preferred form of sequencer 24 which has this capability is available from the Allen Bradley Company and designated model PDQ II.

Head 34 preferably is constructed to have an air gap in core 45 of about 0.001 to about 0.002 inch which would be suitable for most machine applications. Where extreme accuracy in the change of relative movement of the machine members is not required, the air gap can be enlarged to about 0.004 or 0.005 inch so as to produce a strong and wide flux field incident on member 30 to minimize the change of the signal being missed. Core 45 can be laminated of suitable metal stampings or formed of sintered ferrite. Erase head 90 would be of a construction somewhat similar to that of head 34, although head 90 would have a relatively larger air gap and larger winding to accommodate the stronger electrical current required for magnetic erasing. The record and pick-up head 34 and erase head 90 are aligned on opposite sides of member 30 as shown in FIG. 2, and this arrangement permits selective erasure of a specific magnetic recording for the purpose of making fine corrections or adjustments in the desired settings. In addition, either or both of the heads 34 and 90 preferably are spring-loaded to maintain sliding or wiping contact with member 30 as wear takes place.

The magnitudes of resistors 72 and 73 are determined by the effective electrical resistance of head 34 so as to apply a suitable level of bias voltage to winding 46 during the sensing mode. Variable resistor 74 functions as a sensitivity selector for the purpose of compensating for any external electrical noise which may be present.

The system of the present invention is shown in FIG. 1 in a machine having one axis of movement. The system is readily adaptable to machines having a plurality of axes, simply by including additional retentive members 30 for each additional axis, along with the appropriate modifications in the magnetic recording and sensing and electrical signal producing components of the system.

Figure 3:
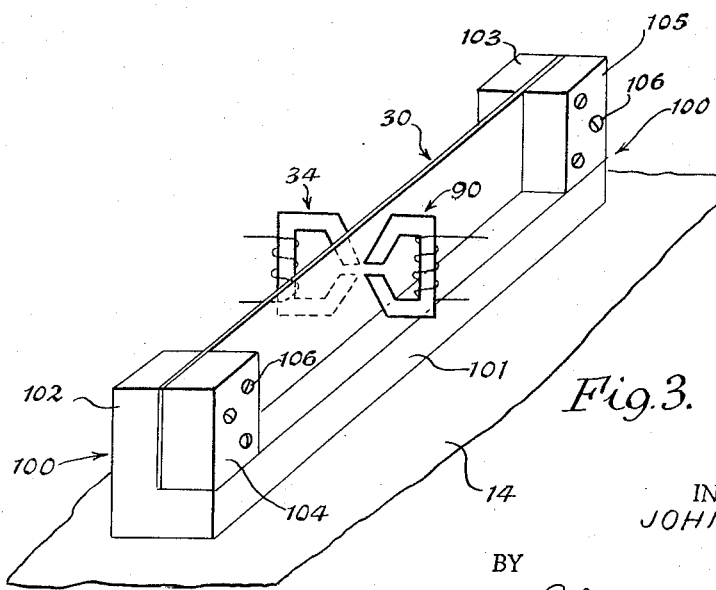
FIG. 3 is a fragmentary perspective view, partly diagrammatic, of apparatus which can be included in the system of FIG. 1.

FIG. 3 shows an arrangement for mounting member 30 in a typical machine 10, and in particular on carriage 14. Member 30 here is in the form of an elongated steel tape which preferably has a thickness of from about 0.003 to about 0.005 inch. Tape 30 is supported in a frame 100 having a base portion 101 generally elongated and rectangular and having a pair of upstanding flanges 102, 103 at each end thereof. Base 101 is fixed to carriage 14. Tape 30 is secured at each end thereof to corresponding ones of flanges 102, 103 by mounting blocks 104 and 105, respectively, by bolts 106 or suitable fasteners. Frame 100 is formed from temperature stabilized steel to minimize expansion and contraction thereof. This compensates for flexing of tape 30 due to the fact that head 34 and head 90, shown diagrammatically in FIG. 3, are mounted on one machine member, i.e. bed 12, and tape 30 on the other, i.e. carriage 14. Furthermore this arrangement compensates for wear on the machine parts and permits heads 34 and 90 to be in constant contact with tape 30 regardless of any transverse movement or vibrations or deflections which can occur in the mechanical slides of machine tools.

It is therefore apparent that the present invention accomplishes its intended objects. The positioning system of the present invention provides accurate changing of the relative movement between machine members with apparatus which is relatively simple in construction and easy to operate and maintain. The system of the present invention can be installed easily and economically on most known machines. The initial setting of the system which is utilized in subsequent machine operations is made relatively quickly and often requires no adjustments.

While a single specific embodiment of the present invention has been described in detail, this has been done by way of illustration without thought of limitation.

I claim:

1. In a machine having first and second relatively movable members, drive means for moving one of said members, and control means coupled to said drive means, a positioning system for changing the relative movement of said machine members after a predetermined distance has been traveled, said system comprising:
   a. a retentive member of magnetizable material mounted on one of said machine members, said retentive member being elongated and flexible;
   b. recording means on the other of said machine members for magnetizing said retentive member at a discrete point thereon corresponding to the relative position of said first and second machine members at which relative movement is to be changed;
   c. sensing means on said other machine member for sensing the recording on said retentive member during relative movement of said machine members and for producing an output signal in response thereto;
   d. means coupling said sensing means to said control means whereby in response to a signal produced by said sensing means said control means causes a change in the relative movement of said machine members;
   e. a support frame mounting said retentive member on said machine member, said frame being secured to said retentive member at opposite ends thereof to permit flexing thereof; and
   f. magnetic erasing means on said other machine member, said erasing means being disposed toward a surface of said retentive member opposite the surface toward which said recording means is disposed, said erasing means being substantially in alignment with said recording means.

2. A positioning system as defined in claim 1, wherein said first and second machine members move in directions parallel to each other and wherein said retentive member is disposed so that longitudinal axis thereof is generally parallel to the direction of relative movement.

3. A positioning system as defined in claim 1, wherein said control means causes stopping of said relative movement when said sensing means produces an output signal.

4. A positioning system as defined in claim 1, wherein said control means causes a change in the rate of said relative movement when said sensing means produces an output signal.

5. A positioning system as defined in claim 1, wherein said control means decreases the rate of said relative movement in response to a first signal from said sensing means and causes stopping of said relative movement in response to a second signal from said sensing means whereby said retentive member can be recorded at two spaced locations therealong corresponding to the relative positions of said first and second machine members where relative movement therebetween is to be decreased in rate and then stopped, respectively.

6. A positioning system as defined in claim 1, wherein said frame is of temperature stabilized material.

7. A positioning system as defined in claim 1, wherein said recording means and said sensing means comprise a core of magnetic material having an air gap positioned adjacent said retentive member, a winding on said core, and switching means having a first position connecting said winding to a direct voltage source for energizing said winding during recording and having a second position connecting said winding to a source of bias voltage and to said coupling means for sensing a recording on said retentive member.

8. A positioning system as defined in claim 7, wherein said coupling means comprises amplifier means connected to said switching means and relay means connected in controlled relation to the output of said amplifier means and in controlling relation to said machine control means.

* * * * *